May 17, 1949.  A. KORSMO ET AL  2,470,704
CROP FEED MECHANISM FOR COMBINES
Filed June 24, 1946  3 Sheets-Sheet 2
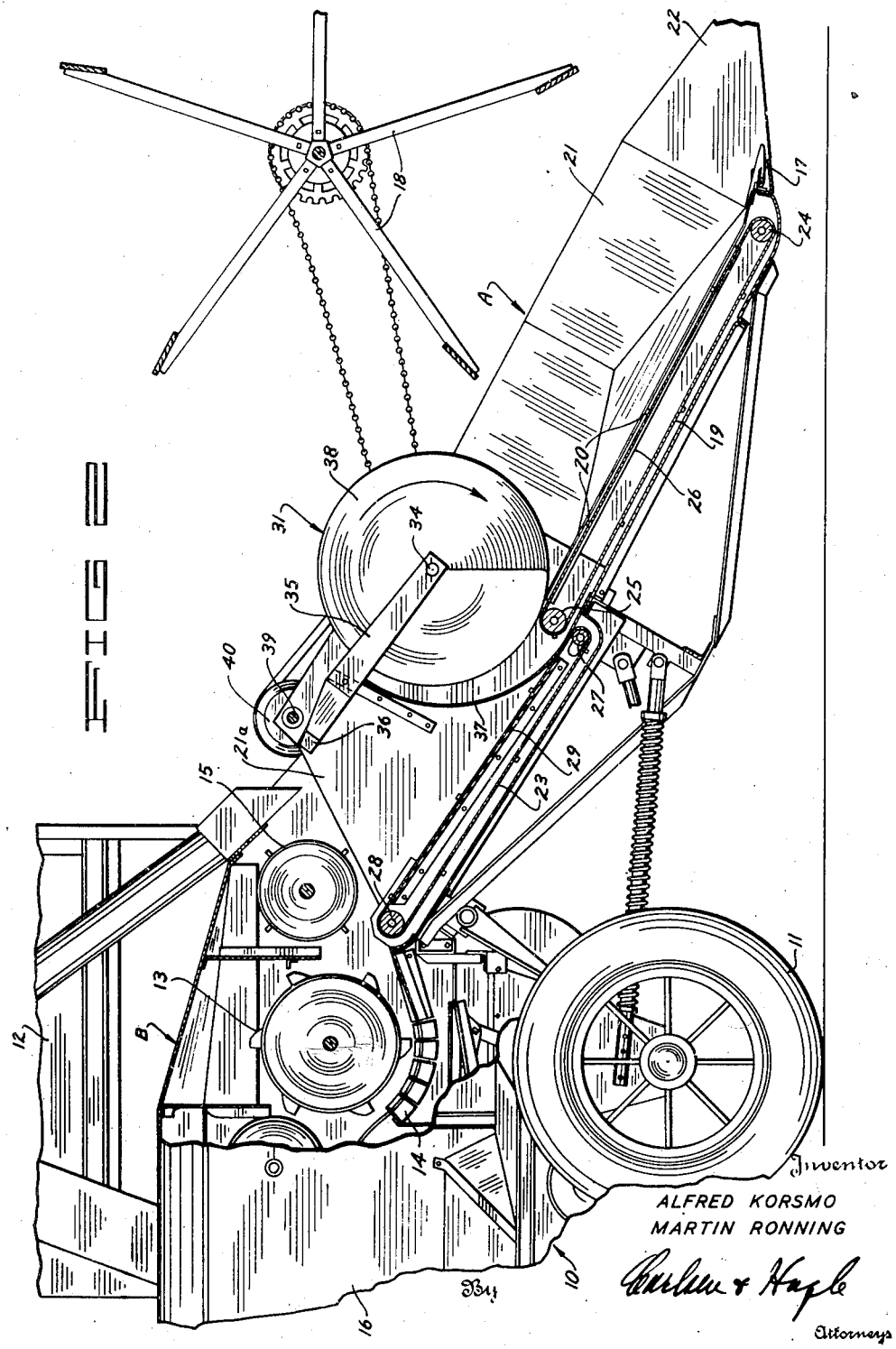
ALFRED KORSMO
MARTIN RONNING

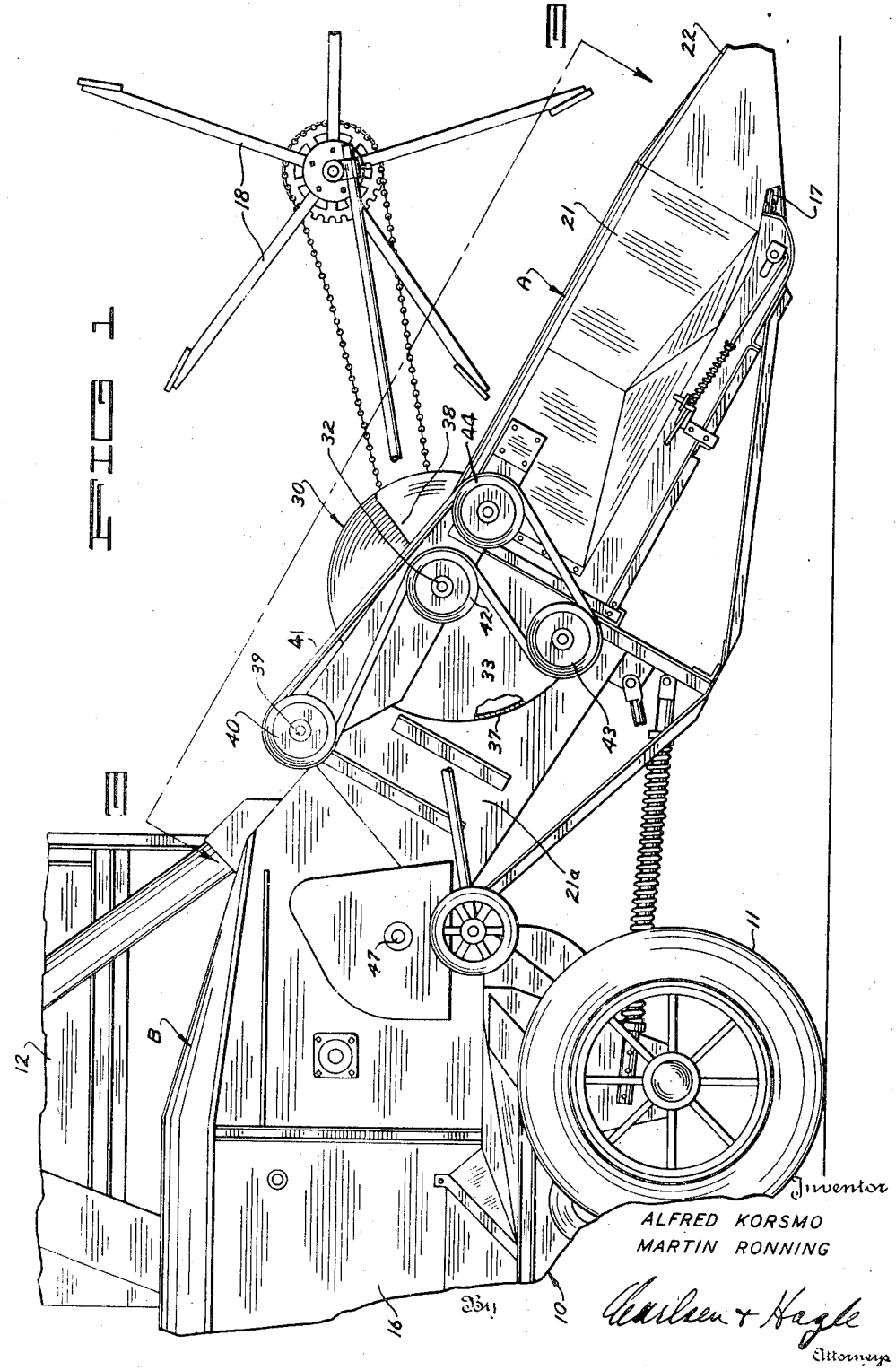

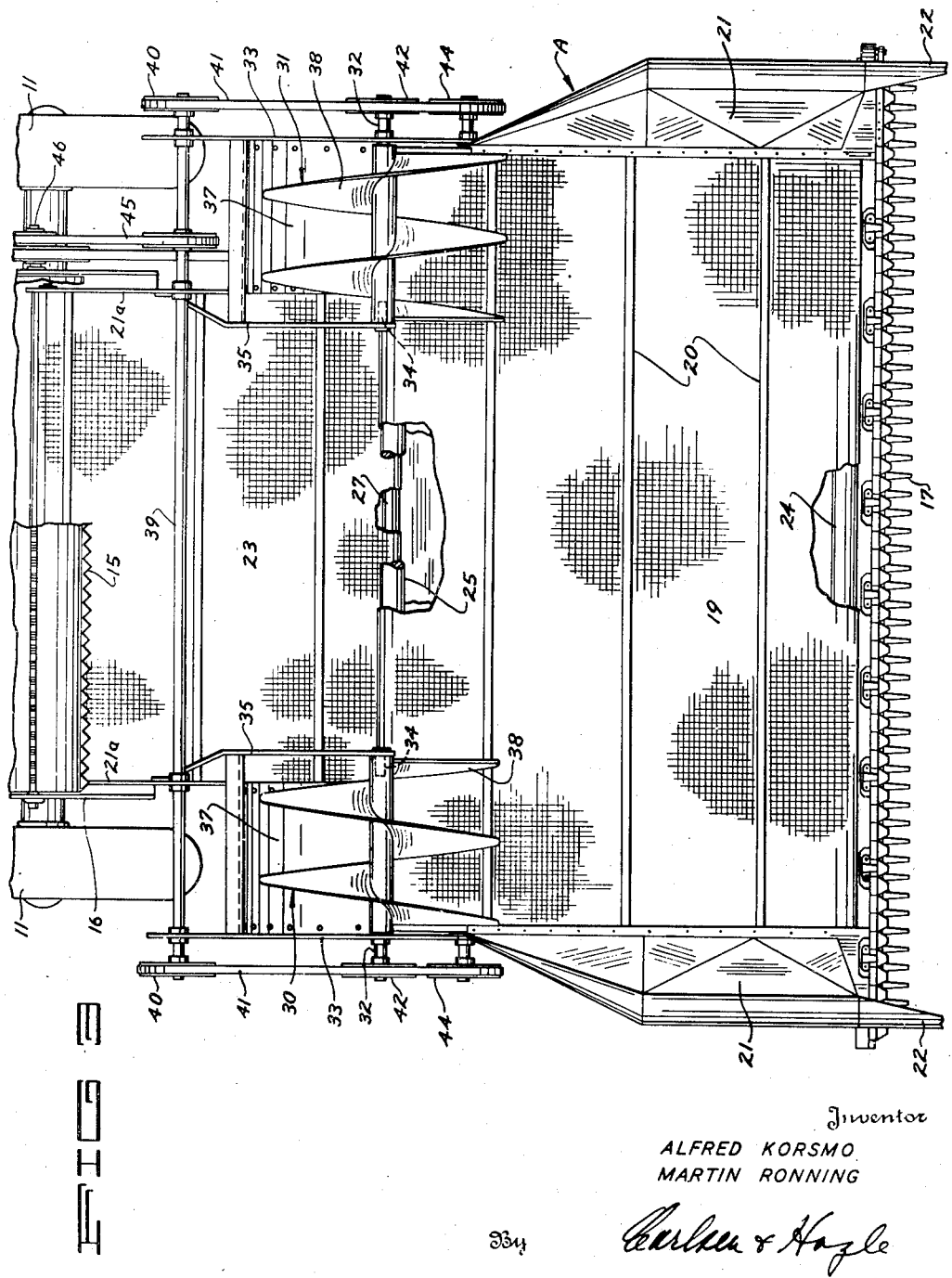

Patented May 17, 1949

2,470,704

UNITED STATES PATENT OFFICE 2,470,704

CROP FEED MECHANISM FOR COMBINES

Alfred Korsmo, Hopkins, and Martin Ronning, St. Louis Park, Minn., assignors to Minneapolis-Moline Company, Hopkins, Minn., a corporation of Minnesota Application June 24, 1946, Serial No. 678,846

13 Claims. (Cl. 56—124)

This invention relates to improvements in combines or harvester-threshers.

The type of combine here in mind is that known as the straight-through type wherein the harvested grain moves straight back to the thresher, as contrasted to the older and generally larger and heavier machine having a transversely extending conveyor projecting to one side of the housing leading back to the thresher. For obvious reasons the thresher housing must be kept as narrow and light as possible, and for equally obvious reasons the harvester should be as wide as possible to cut or harvest a wide swath of grain. In the straight-through combine this has placed a limitation on the size of the machine, or rather the width of the swath harvested and in the attempt to increase the width of the swath without increasing the width and weight of the body part of the machine many expedients have been resorted to. Possibly the best known of these is the machine having oppositely laterally extending platforms and auger conveyors operating thereon to convey parts of the grain cut, by the cutter extending the full width of the machine, to the relatively narrow, centrally located and rearwardly moving conveyor by which all of the grain is moved back to the thresher. Such machines involve various difficulties, however, in the proper delivery of the grain, since it has a tendency to bunch up at the ends of the augers and fail to "turn the corner" onto the conveyor, and otherwise cause improper feed to the thresher.

It is the primary object of this invention to provide an improved crop feed or delivery mechanism for combines of this type which will overcome the disadvantages inherent in other designs for the same purpose, and which will permit the harvesting of a comparatively wide swath of grain and efficient delivery thereof to the thresher elements. Another object is to provide a mechanism or assembly for this purpose having a first or main conveyor arranged behind the cutter and extending substantially the full width thereof and adapted to carry the grain in an even layer rearwardly toward the thresher. At the delivery end of this conveyor is a thresher conveyor which is narrower and delivers grain from the central portion of the wider conveyor straight through into the thresher housing. To gather the grain from the side portions of the first conveyor and deliver it inward toward and upon the narrower thresher conveyor we then provide transverse, inwardly delivering conveyors or augers arranged at each side, over the main conveyor at the delivery end thereof and adapted to move the grain inwardly evenly and feed it to the thresher conveyor without tangling, bunching or other undesirable effects.

It is further an object of this invention to improve the operation of these spiral, gathering conveyors to the end that previously encountered difficulties in such conveyors may be eliminated. Thus we obviate the necessity for the baffles usually necessary to prevent the grain from wrapping around the conveyor, and make it possible to support the conveyors at both ends without interference with the grain delivery at the inner, supported ends of the conveyors. These desirable results are achieved by making the conveyors or augers of larger diameter than usual, proportional to their length, to overcome the wrapping tendency of the grain. Such large augers are readily used when placed, as they are here, well to the rear of the cutter, reel and other necessary forward parts in the usual construction. Then, too, we operate the auger or spiral conveyors closely over the rearwardly moving surface of the main conveyor and the action of the augers is thus influenced by the fact that the grain is in motion on the main conveyor when engaged and traveled inwardly by the auger flights, and this close spaced relation of the conveyors further assists in the delivery of small broken up grain to the thresher conveyor.

Other objects and advantages of our invention will be made apparent in the course of the following specification, reference being had therein to the accompanying drawing wherein:

Fig. 1 is a side elevation of the forward portion of a combine embodying our invention.

Fig. 2 is a similar view but with all but the rear part of the machine shown in longitudinal, vertical section.

Fig. 3 is a plan view, viewing the machine along the line 3—3 in Fig. 1, with certain parts omitted and portions of the conveyors broken away.

Referring now more particularly and by reference characters to the drawing, 10 designates generally the main frame of the machine, which is supported upon wheels 11. Longitudinal stability may be provided either by rear wheels (not shown) or by a hitch connection to a tractor (also not shown) according to any usual practice.

The combine proper includes a header or harvester A which cuts the grain as the machine moves forwardly over the field and a thresher or separator B which separates the grain from the straw, delivering the former to a grain tank 12 and discharging the straw at the rear of the machine. The thresher B has the usual rotary cylinder 13 operating over a concave 14 to rub out the grain from the straw, and a rotary beater 15 which assists in delivering the grain to the cylinder. These, and other elements of the thresher, are arranged in a comparatively narrow, elongated housing 16, the forward end of which opens into the header A to receive grain therefrom.

The header A has the usual cutter or sickle 17 across its forward edge and a conventional reel 18 which moves the standing grain into proper cutting relation to the sickle and then lays it over flat on a conveyor 19 which carries the grain upwardly and rearwardly toward the feed opening into the thresher housing 16. The conveyor 19 is of the endless belt or canvas type having transverse slats or raddles 20 and it extends almost the full width of the cutter 17. The header has upstanding side portions 21 and outwardly and forwardly diverging gathering points 22 which direct the narrow strips of grain cut by the sickle to each side of the conveyor onto the conveyor in usual fashion.

In the ordinary, narrow cut straight through combine, the conveyor runs straight back into the thresher B and the width of the cut is thus limited by the permissible width of the thresher housing 16 into which the conveyor must operate, plus the gather of the points 22. Necessarily the thresher housing is fairly narrow and thus an undesirable limitation is placed upon the width of the swath which can be cut by the machine. To get around this difficulty in the larger machines, one, or usually two, platforms are extended laterally each side from the forward end of the conveyor, the cutter is extended the full combined width of the platforms and conveyor, and opposed augers are used to deliver the grain inwardly from each platform onto the conveyor. As stated, heretofore, this construction, while permitting a wide cut, introduces difficulties in the delivery of the grain from the platforms to the conveyor.

In accordance with our invention two longitudinally moving conveyors are provided between the cutter 17 and the feed opening into the thresher housing. The first, and forwardly located conveyor is that previously identified at 19 and it, as stated, extends substantially the full width of the cutter. The second conveyor, also of the endless variety, is indicated at 23 and it is narrower than conveyor 19 and of such width that it is adapted to enter the thresher housing. Thus, the width of housing 16 need not now control the width of the main or first conveyor 19, which may then be as wide as desired, within practical limits, so that the machine may cut a wide swath. The first conveyor 19 runs over front and rear rollers 24 and 25 journaled between the sides of the header housing, and the upper flight of the conveyor operates in usual manner, traveling rearwardly and upwardly, over a false bottom 26 of said header housing. The second, narrower conveyor 23 likewise runs over rollers 27 and 28 and its upper flight travels in the same direction over another false bottom 29. The upper rear roller 25 is positioned above the forward, lower roller 27 so that the delivery end of conveyor 19 extends over the receiving end of the conveyor 23. Thus grain moved back by conveyor 19 will fall over upon the conveyor 23 for travel thereon back to the thresher.

It is necessary, of course, to move the grain from the sides of the wider, first conveyor inwardly transversely so that all of the grain carried by this conveyor will run over onto the narrower second conveyor 23. For this purpose we provide short opposed augers or auger conveyors 30 and 31. The axes of augers 30 and 31 are aligned and transversely extended and are located above and slightly forward of the junction between conveyors 19 and 23. Outer ends of the augers have drive shafts 32 journaled through side plates 33 affixed to the header and at their inner ends the augers are journaled upon stub shafts 34 carried at the forward ends of brackets 35. It may here be noted that the rear, upper part of the header housing will have its sides 21ª relatively closer together, than the sides of the forward part in order to fit closely the margins of the narrower second conveyor 23, and it is to these sides 21ª that brackets 35 are welded or otherwise fastened, as indicated at 36.

The difference in width of forward and rearward portions of the header housing accommodates auger troughs 37 which join the side plates 33 and 21ª, and are open at forward sides and inner ends. The troughs 37 curve downwardly and forwardly from their upper edges, just behind the augers 30 and 31, to and beneath the delivery end of the first conveyor 19, as clearly shown in Fig. 2 and they thus closely follow the arcuate, rear, lower contour of the augers.

The augers 30 and 31 have the usual spiral vanes 38 and the diameter of these is such that the peripheral margins of the vanes just clear the upper, rearwardly moving flight of the conveyor 19. The length of the augers is such that they extend from the lateral margins of this conveyor inwardly each a short distance beyond or to the inside of the corresponding margins of conveyor 23. The augers are rotated in the same direction, so that they travel rearwardly at their lower edges as indicated by the arrow in Fig. 2, and for this purpose any suitable drive mechanism may be used. As here shown, merely for example, the drive is taken from a transverse shaft 39 having pulleys 40 at each end over which are trained belts 41 leading around pulleys 42 on the auger shafts 32. The belts 41 also travel around pulleys 43 connected to the roller 25 to operate conveyor 19, and adjustable tightener pulleys 44 are provided to keep the belts tight. The shaft 39 is driven by a belt 45 from any suitable running shaft of the thresher B such as indicated at 46 in Fig. 3. The second conveyor 23 is operated in the usual manner by a driven shaft 47 connected to its upper roller 28 and it may here be noted that the header A may be arranged for its usual up and down adjustment about the axis of roller 28 or any other suitable point, in order to vary the cutting height.

In operation all of the grain cut by cutter 17 will fall over onto the first conveyor 19 and will be carried thereby upwardly away from the cutter. The central part of the grain on the conveyor 19 will be delivered directly onto the second conveyor 23 for delivery therefrom to the beater 15 and thence to the threshing cylinder 13. The lateral portions of the grain stream on conveyor 19 will be engaged by the augers 30 and 31 and moved thereby inwardly so that this grain also is delivered to the conveyor 23, as will be readily apparent.

The augers 30 and 31 according to our invention have several desirable characteristics in construction and operation which contribute materially to the effectiveness of the machine. In the first place, the augers are larger in diameter than usual, and very large in proportion to their length. Thus the tendency of the grain to wrap or twist around the augers, very pronounced in other machines, is overcome since a long narrow (radially) lower part of the vanes contacts the grain, and the grain will have no tendency to engage the hub or center of the auger and wrap therearound. This further makes it unnecessary to employ baffles in the troughs 37 to prevent wrapping. In addition any extra long grain stalks falling over onto the auger are thrown forwardly and delivered without trouble, due to the large auger diameter. The augers also, as stated, run as close as possible to the upper flight of conveyor 19, thus to move short broken grain stuff inwardly without trouble, and without allowing it to drop down behind the upper end of the conveyor.

It is believed that the augers 30 and 31 should have a higher surface speed than the conveyor 19 for best operation and to move the grain as quickly as possible to the conveyor 28, giving the grain less chance to wrap about the augers. The exact critical auger speed, if any, is not as yet determined and we accordingly do not intend to limit ourselves in respect thereto. As here shown the large diameter augers will, of course, have a higher surface or peripheral speed, as compared to the travel of conveyor 19 about the small diameter rollers 24 and 25, and the augers are shown as having a short pitch to accommodate this high surface speed.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a combine having a thresher part and a harvester part located forwardly thereof, a first endless conveyor for moving grain from the harvester part in a rearward direction, a second endless conveyor for directly receiving a part of the grain from the first conveyor and delivering the grain rearwardly to the thresher part, and conveyor means operating over the first conveyor for moving part of the grain on the first conveyor in a transverse direction before it is delivered to the second conveyor.

2. In a combine having a thresher part and a harvester part located forwardly thereof, a first endless conveyor for moving grain from the harvester part in a rearward direction, a second endless conveyor positioned for receiving a part of the grain from the first conveyor and delivering the grain rearwardly to the thresher part, and a pair of transversely operating conveyors positioned over the first conveyor for moving part of the grain in a transverse direction as it is delivered from the first to the second conveyor.

3. In a combine having a thresher part and a harvester part located forwardly thereof, a first endless conveyor for moving grain from the harvester part in a rearward direction, a second endless conveyor for receiving grain from the first conveyor and delivering the grain rearwardly to the thresher part, the first conveyor being wider than the second and projecting at each side beyond the corresponding side of the second conveyor, and a pair of transverse conveyors positioned over the said projecting sides of the first conveyor for moving grain thereon inwardly and delivering this grain to the second conveyor.

4. In a combine having a thresher part and a harvester part located forwardly thereof, a first endless conveyor for moving grain from the harvester part in a rearward direction, a second endless conveyor for receiving grain from the first conveyor and delivering the grain rearwardly to the thresher part, the said first conveyor being wider than the second and extending at its lateral margins beyond the corresponding lateral margins of the second conveyor, and conveyor augers positioned over the first conveyor for gathering the grain from the lateral portions of the first conveyor and delivering these parts of the grain to the second conveyor.

5. In a combine having a thresher part and a harvester part located forwardly thereof, a first conveyor for moving grain from the harvester part in a rearward direction, a second conveyor having its receiving end positioned for receiving grain from the first conveyor and delivering the grain rearwardly to the thresher part, the said first conveyor being wider than the second and extending at its lateral margins beyond the corresponding lateral margins of the second conveyor, and transverse auger conveyors located above the first conveyor and operative at their lower edges on the grain to move the grain inwardly from the said lateral margins of the first conveyor and deliver this grain to the second conveyor.

6. In a combine having a thresher part and a harvester part located forwardly thereof, a grain conveyor operating to move grain rearwardly from the harvester part to the thresher part, and at least one auger conveyor positioned over the conveyor for moving a part of the grain traveling on said conveyor in a transverse direction.

7. In a combine having a thresher and a harvester located forwardly thereof, a first conveyor for moving grain rearwardly from the harvester, a second conveyor narrower than the first conveyor and operative to receive grain from the central part of the first conveyor and deliver the grain rearwardly to the thresher, and conveyors positioned above and operating at the delivery end of the first conveyor for gathering grain from the outer parts thereof and moving the grain inwardly onto the second conveyor.

8. In a combine having a thresher and a harvester located forwardly thereof, a first conveyor for moving grain rearwardly from the harvester, a second conveyor narrower than the first conveyor and operative for receiving grain from the central part of the first conveyor and delivering the grain rearwardly to the thresher, transverse auger conveyors operating over the lateral parts of the first conveyor for moving grain therefrom inwardly and delivering it to the second conveyor, and the inner ends of the auger conveyors being extended inwardly beyond the lateral margins of the second conveyor.

9. In a combine having a harvester and a thresher, means for transferring grain rearwardly from the harvester to the thresher comprising a first endless conveyor for receiving harvested grain and moving it rearwardly, transverse auger conveyors located above the first conveyor and operative at lower edges for gathering lateral portions of the grain travelling on the first conveyor and moving the gathered grain toward the center of that conveyor, and a second endless conveyor narrower than the first conveyor and running rearwardly from beneath the center thereof to deliver all of the grain rearwardly to the thresher.

10. In a combine having a thresher and a harvester arranged forwardly thereof, said harvester having a housing having a narrow rear portion and a wider front portion, a wide endless conveyor operating in the front portion of the harvester housing for delivering grain rearwardly, a narrow endless conveyor operating in the narrow rear part of the housing for receiving grain from the central portion of the wide conveyor and delivering it to the thresher, spiral conveyors positioned above and extending forwardly over the lateral portions of the wide conveyor adjacent its delivery end for moving grain thereon inwardly for delivery onto the narrow conveyor, and transversely extending and inwardly opening troughs joining the front and rear portions of the harvester housing and extending partially around the rear of the spiral conveyors.

11. In a combine having a transverse cutting mechanism, a conveyor system extending rearwardly from the cutting mechanism and comprising a first endless conveyor extending substantially the full width of the cutting mechanism to deliver crop materials rearwardly, augers positioned above and operative at their lower edges over the lateral portions of the conveyor to move corresponding portions of the grain inwardly toward the center of the conveyor, and a second conveyor narrower than the first and operative to receive all of the grain therefrom and deliver the grain further rearwardly.

12. In a combine, the combination with an endless conveyor for moving grain in one direction, of an auger conveyor arranged above the endless conveyor for moving a part of the grain thereon in a transverse direction, and said auger conveyor having vanes the lower edges of which operate closely adjacent the surface of said endless conveyor to thereby operate upon and move all the grain including small broken stuff.

13. In a combine, the combination with an endless conveyor for moving grain in one direction, of an auger arranged transversely above a part of the conveyor and having a spiral vane operating at its lower edge over the surface of the conveyor for moving grain thereon in a direction transverse to the travel of the conveyor, said auger being of large diameter so that only a narrow peripheral edge portion of its vane engages the grain on the conveyor.

ALFRED KORSMO.
MARTIN RONNING.

REFERENCES CITED

The following references are of record in the file of this patent:

UNITED STATES PATENTS

| Number | Name | Date |
| --- | --- | --- |
| 1,073,819 | Rice | Sept. 23, 1913 |
| 2,122,673 | Sheets | July 5, 1938 |
| 2,332,006 | Oehler | Oct. 9, 1943 |